United States Patent
Herrero Zabaleta et al.

(10) Patent No.: US 9,096,388 B2
(45) Date of Patent: Aug. 4, 2015

(54) STRUCTURAL PROFILE ROTATOR, AND ROTATOR AND CONVEYOR ASSEMBLY

(71) Applicant: GEKA AUTOMATION S.L., Oiartzun, Guipuzcoa (ES)

(72) Inventors: Alberto Jose Herrero Zabaleta, Guipuzcoa (ES); Jon Gurruchaga Recarte, Guipuzcoa (ES)

(73) Assignee: GEKA AUTOMATION S.L., Oiartzun, Guipuzcoa (ES)

( * ) Notice: Subject to any disclaimer, the term of this patent is extended or adjusted under 35 U.S.C. 154(b) by 0 days.

(21) Appl. No.: 14/253,708

(22) Filed: Apr. 15, 2014

(65) Prior Publication Data

US 2014/0311865 A1    Oct. 23, 2014

(30) Foreign Application Priority Data

Apr. 17, 2013  (ES) .................... 201330555

(51) Int. Cl.
- B65G 47/252 (2006.01)
- B23Q 7/16 (2006.01)
- B65G 41/00 (2006.01)
- F16H 21/44 (2006.01)
- B21B 39/20 (2006.01)

(52) U.S. Cl.
CPC ............. *B65G 41/002* (2013.01); *B23Q 7/165* (2013.01); *B65G 47/252* (2013.01); *F16H 21/44* (2013.01); *B21B 39/20* (2013.01); *Y10T 74/1892* (2015.01)

(58) Field of Classification Search
CPC .......... B23Q 7/165; B23Q 1/525; B23Q 3/18; F16H 21/44; B65G 41/002; B65G 47/244; B65G 47/248; B65G 47/252; B21B 39/20; B21B 1/08; Y10T 74/1892
USPC .......... 198/402, 403, 411, 412, 413; 414/754, 414/758, 759, 779, 780
See application file for complete search history.

(56) References Cited

U.S. PATENT DOCUMENTS

| 3,021,018 | A | * | 2/1962 | Paxson | 414/754 |
| 3,319,804 | A | * | 5/1967 | Beatty et al. | 414/759 |
| 3,780,882 | A | * | 12/1973 | Wagner | 414/759 |
| 6,779,787 | B2 | * | 8/2004 | Gryder et al. | 269/71 |
| 7,985,044 | B2 | * | 7/2011 | Tamura | 414/771 |
| 2001/0022931 | A1 | * | 9/2001 | Ewaschuk | 414/759 |
| 2001/0030103 | A1 | * | 10/2001 | Runonen | 198/403 |
| 2010/0196133 | A1 | * | 8/2010 | Pass et al. | 414/759 |
| 2012/0177475 | A1 | * | 7/2012 | Nguyen | 414/777 |

* cited by examiner

*Primary Examiner* — Mark A Deuble

(57) ABSTRACT

Structural profile rotator that can be used with a structural profile conveyor device. The rotator (150) comprises two blades (10,40) attached to a spindle (5) and which define between them a variable angle, comprised for example between 90° and 180°, a pushing member (35) disposed below the first blade (10) and arranged to push the second blade (40) so that it rotates about the spindle (5); and rotation members (80*a*, 80*b*), which may be parallel to the second blade (40) arranged to rotate said spindle (5).

20 Claims, 6 Drawing Sheets

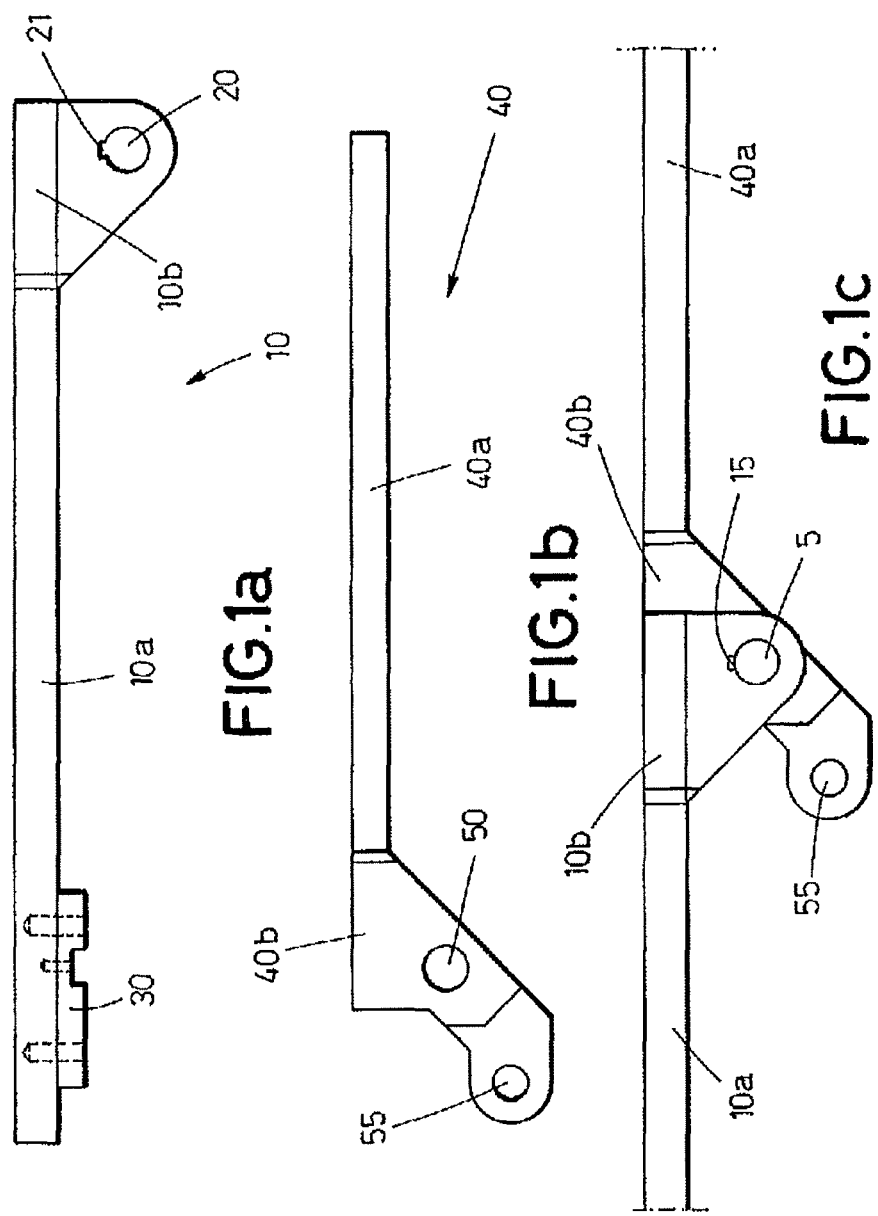

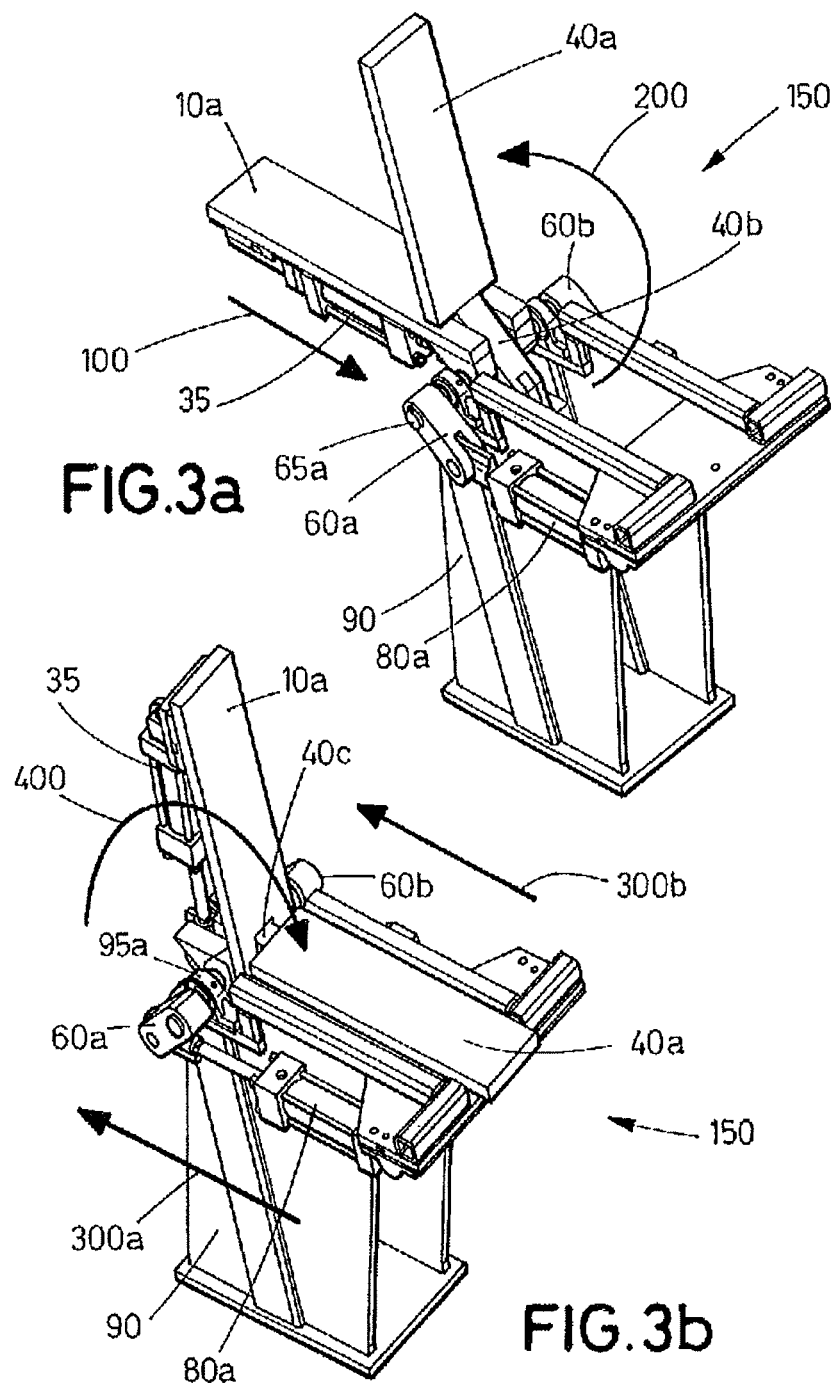

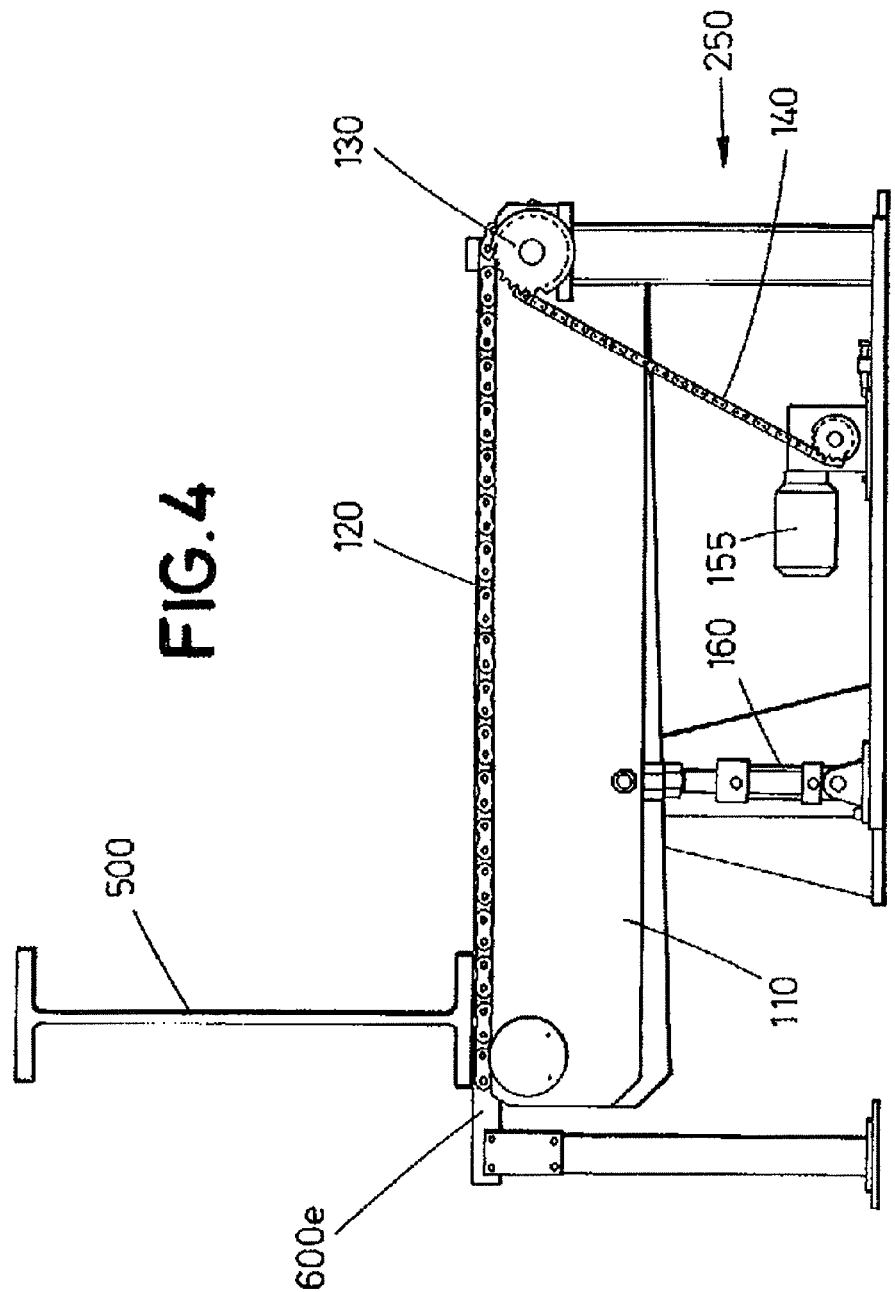

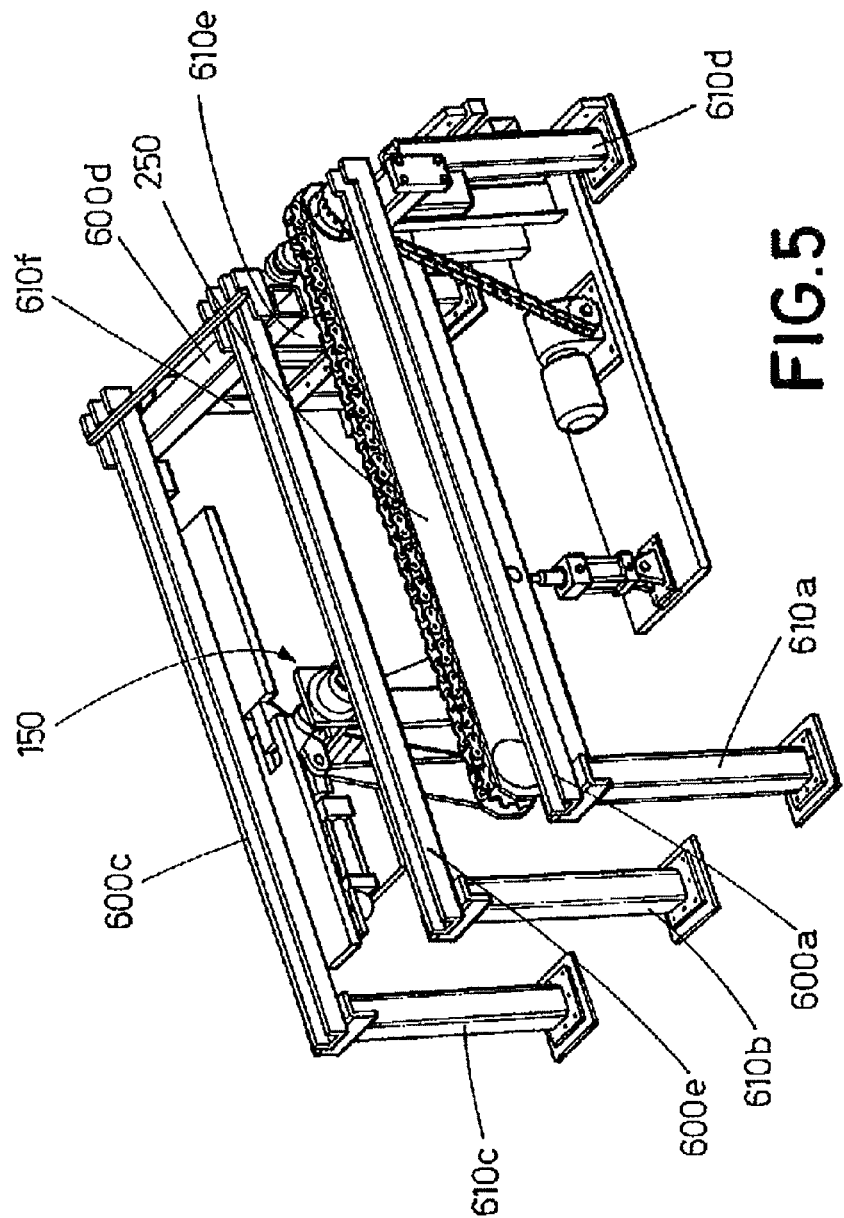

STRUCTURAL PROFILE ROTATOR, AND ROTATOR AND CONVEYOR ASSEMBLY

FIELD OF THE INVENTION

The present invention relates to a structural profile rotator for use on a machining line, for example, a drilling and/or cutting line designed to make different types of holes (standard, countersink, threaded, etc.), slots and/or reliefs on said structural profiles. The invention also relates to a rotator and conveyor assembly.

BACKGROUND OF THE INVENTION

Structural profiles are well-known components, frequently used in the technical sector of construction to create the supporting structures of buildings. They are made of steel, metal alloys, concrete, wood or polymers, or combinations of these materials, they have an elongated shape and, depending on the specific use they are designed for, their cross-section may have many different shapes. In most cases, structural profiles comprise at least one main elongated portion, called the web, and at least one other portion called the flange, also having an elongated and narrow shape, which is transversally fixedly attached with one of the edges of the web, in such a way that the main axis of the flange is parallel to the main axis of the web. The cross-sections of this class of structural profile are usually in the shape of a T, double T, L, U or C.

To build the supporting structure of a building it is essential to attach firmly together the different structural components it comprises. For this reason, it is often necessary to provide structural profiles with different types of holes, slots, and/or reliefs, arranged to allow for said joints and disposed in a determined configuration, which varies according to the specific position that said structural profiles occupy within the supporting structure.

Current structural profile manufacturing plants tend to be provided with drilling and/or cutting lines which mechanically perform this operation as follows: the structural profiles are conveyed by conveyor devices along the drilling and/or cutting line until they reach a working position, where they are immobilised by appropriate means. Next, programmable drilling and/or cutting devices come into contact with the structural profiles and make in said structural profiles the holes, slots and/or reliefs that they are programmed to make.

Some of said programmable drilling and/or cutting device only have one direction of operation, meaning that in order to make holes, slots and/or reliefs on more than one different face of the same structural profile it is necessary to work first on one face and, then, to separate said structural profile from the programmable drilling and/or cutting devices, normally by means of the conveyor devices, to rotate said structural profile and to carry it back to the working position to work on the second face, and so on successively until completing the process.

To carry out the operation of rotation different structural profile rotators have been proposed, integrated in the drilling and/or cutting line and which operate jointly with the conveyor devices. In some cases, said structural profile rotators are, furthermore, integrated in the conveyor devices.

Patent document US-2012/177475-A1 discloses a structural profile rotator which comprises two arms or blades that can rotate around a common spindle, said spindle being attached to the upper part of a rotation member with a first convex curved side and a second side provided with a step. A first hydraulic cylinder (which comprises a barrel cylinder closed at one of its ends and which houses inside a moveable piston connected to a piston rod) is attached by one of its ends to the portion of the second side of the rotation member comprised between the spindle and the step, with the other end of said first hydraulic cylinder being fixedly attached with the second moveable arm. Also, a second hydraulic cylinder, disposed in parallel to the first hydraulic cylinder, is attached by one of its ends to the portion of the second side of the rotation member, situated below the step. Upon actuating the first hydraulic cylinder, the rotation member that is attached to said first hydraulic cylinder makes the second arm turn about the axis. Similarly, upon actuating the second hydraulic cylinder the rotation member makes the first arm rotate in relation to the second arm. The assembly comprising the first arm, the second arm, the axis, the rotation member, the first cylinder and the second cylinder is housed within a protective cover without a lid which allows the first and second arms to rotate, maintaining all other components of said assembly out of sight. The lower part of the protective cover is provided with rolling members that can move on a track situated below, in such a way that this structural profile rotator assembly is integrated, moreover in a structural profile conveyor assembly.

As with all other devices known to man, in hydraulic cylinders, operating problems can appear caused by continuous use. One of said problems consists of the fact that, over time, the piston rods of said hydraulic cylinders bend slightly. This problem can affect a structural profile rotator such as the one disclosed in patent document US-2012/177475-A1 very negatively because its two hydraulic cylinders are disposed one on top of the other, in a parallel manner and very close to each other, meaning that if the piston rod of one of said cylinders becomes bent, it can interfere with the run of the other one hindering, or even preventing, normal operation.

To avoid this and other problems, hydraulic cylinders are subjected to periodic inspections and maintenance which are especially tedious in a structural profile rotator like the one disclosed in patent document US-2012/177475-A1, given that in order to carry them out, it is necessary to first withdraw said rotator from the track and then to dismantle the protective cover. Once said maintenance and inspection tasks have been completed, to return to normal operating conditions, the protective cover must be mounted and the rotator coupled to the track.

Furthermore, the disposition of the two hydraulic cylinders on the same vertical plane can imply drawbacks and limitations in terms of the space occupied on the vertical plane, reducing user's options in the case of requiring to replace one cylinder for a new one, for example, in the context of a repair or maintenance operation.

At the same time, the dimensions and runs (in other words, the distances between the closed end of the barrel cylinder and the opposite end of the piston rod in its position of maximum displacement of the moveable piston) of the two hydraulic cylinders comprised by the structural profile rotator disclosed in patent document US-2012/177475-A1, must be sufficiently small to allow said hydraulic cylinders to be housed one on top of the other and in parallel within the protective cover and, moreover, to be able to extend and contract adequately. This restriction limits the number of components that can be used in the manufacture of a structural profile rotator according to patent document US-2012/177475-A1 therefore reducing the versatility of manufacture of said rotators and even being able to limit the number of specific applications wherein it is possible to use said rotators.

DESCRIPTION OF THE INVENTION

A first object of the present invention is to provide a structural profile rotator that deals with these and other drawbacks of the prior technique.

More particularly, the structural profile rotator according to the invention comprises two blades attached, at a point close to one of their ends to the central portion of a spindle that can be firmly secured to a chassis, in such a way that said blades define a variable angle between them.

The first blade is fixedly attached to said spindle, and the second blade is attached to the spindle in a non-fixed manner, being also attached to at least one pushing member, disposed below the first blade and arranged to push said second blade so that it rotates about the spindle, to modify the angle between said first blade and said second blade.

Each of the peripheral or end portions of the spindle are fixedly attached to a connection member attached, in turn, to a rotation member, arranged to rotate said spindle, so that the first blade pivots, namely, so that it pivots in respect of said spindle, in other words, with the rotation of said spindle. In this way, the rotation members can modify the orientation of the first blade in respect of a chassis or support of the rotator, and the pushing member can modify the angle between the first blade and the second blade.

In the rotator according to the invention, each of the blades is actuated by a different device: the first blade rotates, as it is fixedly attached to the spindle, when the rotation members make said spindle rotate, whereas the second blade is actuated by means of the pushing member or members. The rotation members and the pushing member (or members) can be disposed on opposite sides of the rotator. Thanks to this specific configuration, the rotation members cannot interfere during their displacement with the pushing member (or members). Similarly, the pushing member (or members) cannot interfere with the rotation members either during their displacement. Also, given that the rotation members act on end portions of the spindle, it is possible to have a structure wherein the rotation members are easily accessible from the sides of the rotator, which facilitates maintenance tasks, parts replacements, etc. In addition, given that the rotation members and the pushing member or members can be disposed on the same horizontal plane without interfering with each other, it is possible to reduce the space that the components occupy jointly on the vertical plane.

Said specific configuration does not substantially impose either restrictions on the dimensions of the rotation members, or of the pushing member (or members).

In some embodiments of the invention, the rotator is configured so that the variable angle can be varied between 90° and 180°.

In some embodiments of the invention, the rotator is configured in such a way that when the blades are oriented horizontally, the pushing member is situated to one side of the vertical plane comprising the spindle, and the rotation members are situated on the other side of said vertical plane comprising the spindle. In other words, these elements are disposed on different sides of the spindle, in such a way as to avoid interference between them, which increases flexibility in the design and choice of adequate devices to constitute the pushing member (or pushing members, if there are more than one) and the rotation members.

In one embodiment of the invention, the structural profile rotator further comprises a support provided, on its upper part, with two parallel lugs. Said lugs are provided with respective through-holes aligned with each other, arranged to house the spindle.

On a separate note, each one of the connection members can comprise a plate, provided in its upper portion, with a hole with a keyway arranged to fixedly attach said connection member to the spindle by inserting a key, being further provided in the lower portion of each plate with another through-hole, arranged to attach said connection member to one of the rotation members.

Optionally, the blades comprise a thin elongated portion, arranged to retain and/or support the structural profiles and a thicker portion which extends in a perpendicular direction—seen on a vertical plane—from the surface of the thin elongated portion and is arranged for the connection of said blade with other elements of the structural profile rotator. The first blade may be provided in its thick portion with at least one hole with a keyway arranged to fixedly attach said first blade to the spindle with the insertion of another key. Similarly, the second blade can be provided in its thick portion with a first hole, arranged to attach said first blade to the spindle (in a non-fixed manner) and a second hole arranged to attach said second blade to the pushing member. The terms "thin" and "thick" are used here to refer to the extension of the blades on a vertical plane; in other words, for example, here the term "thin" is issued to refer to a relatively small distance between the upper surface and the lower surface of the blade.

In a preferred embodiment of the invention, the thick portion of the first blade is provided, in the central region of its end nearest to the spindle, with a slot, the thick portion of the second blade being likewise provided in the central region of its end nearest to the spindle with a part in the shape of a peg which has a substantially similar width to the width of the slot provided in the first blade. This specific configuration of the blades facilitates the movement of one blade in respect to the other.

Both the pushing member as well as the rotation members can be hydraulic cylinders or leadscrews actuated by a motor. Likewise, the pushing member may be attached to the first blade.

Another aspect of the invention relates to a structural profile rotator and conveyor assembly, which in addition to the rotator described above comprises a structural profile conveyor device, arranged to transport structural profiles according to a determined direction of transport. The rotator is disposed in parallel to said structural profile conveyor device. The structural profile rotator and the structural profile conveyor are independent and are disposed in parallel to each other and can do without protective covers, meaning that maintenance and inspection operations can be easily performed.

In one embodiment of the invention, the structural profile conveyor device comprises:
  a structural profile supporting framework provided with a frame held by pillars, said supporting framework being arranged to support the structural profiles; and
  structural profile pulling means housed within the supporting framework's frame and arranged to pull the structural profiles to move them in the direction of transport.

Optionally, the pulling means may be disposed below the frame and may be provided with a lifting member, arranged to lift said pulling means and situate them at the same height as the frame. More particularly, the pulling means may comprise a central body on which a conveyor chain is disposed, said conveyor chain being actuated by a toothed wheel, attached to a geared motor by means of a geared motor chain.

Said lifting member of the pulling means may comprise at least one hydraulic cylinder or leadscrew actuated by a motor or an electrovalve, arranged to lift the central body of the pulling means.

In another embodiment of the invention, the structural profile conveyor device comprises pulling means, in parallel to the structural profile rotator and disposed on either side of said structural profile rotator, each of said pulling means being arranged to pull one of the ends of the structural profiles. This embodiment of the structural profile conveyor device, by pulling simultaneously the two ends of the structural profiles and not just one of them, reduces the likelihood of said structural profiles being twisted during transport.

According to the invention, it is also possible to have a structural profile rotator and conveyor assembly which comprises two or more structural profile rotators and one structural profile conveyor, said structural profile conveyor device comprising two or more pulling means. With said assembly it is possible to rotate and/or convey several structural profiles at the same time.

A second object of the invention relates to a method of use of a structural profile rotator and conveyor assembly which comprises the following stages:

a) loading a structural profile on the structural profile conveyor device, in such a way that the main axis of the structural profile is substantially perpendicular to the direction of transport;

b) actuating the structural profile conveyor device to convey said structural profile to the working position where the holes, slots and/or reliefs are made on a first face of said structural profile;

c) actuating the structural profile conveyor device so that it moves in an opposite direction to the one described in stage b) and removing said structural profile from the working position, conveying it to a position where the structural profile rests on the first blade of the structural profile rotator at a point close to the spindle, said structural profile rotator moreover having its two blades forming an angle of 180° to each other;

d) actuating the pushing member of the structural profile rotator to rotate the second blade to a position in which it forms an angle of 90° with the first blade;

e) actuating the rotation members of the structural profile rotator to rotate the spindle 90°, in such a way that both the first blade and the second blade equally rotate 90°, rotating the structural profile;

f) actuating the rotation members of the structural profile rotator in the opposite sense to that of stage e) to rotate the first blade until it once again forms 180° with the second blade; and g) repeating stages b) to f) as many times as required.

In stage f) described above, the second blade does not rotate together with the first blade because it is not fixedly attached to the spindle and has the structural profile on it which prevents it from moving.

BRIEF DESCRIPTION OF THE DRAWINGS

To complement the description and with a view to contributing towards a better understanding of the characteristics of the invention, according to an example of a practical embodiment thereof, a set of drawings is attached as an integral part of the description, which by way of illustration and not limitation, represent the following:

FIG. 1a is a profile view of the first blade of a structural profile rotator according to the invention;

FIG. 1b is a profile view of the second blade of a structural profile rotator according to the invention;

FIG. 1c is a profile view of the joint of the first blade and the second blade to the spindle;

FIG. 3a is a perspective view of a structural profile rotator according to the invention which illustrates the movement of rotation of the second blade;

FIG. 3b is a perspective view of a structural profile rotator according to the invention which illustrates the joint movement of rotation of the first blade and the second blade about the spindle;

FIG. 4 is a profile view of the pulling means of the structural profile conveyor device;

FIG. 5 is a perspective view of the complete assembly of the invention, made up of the structural profile rotator and the structural profile conveyor device.

DESCRIPTION OF A MODE OF EMBODIMENT OF THE INVENTION

Figure 1D:
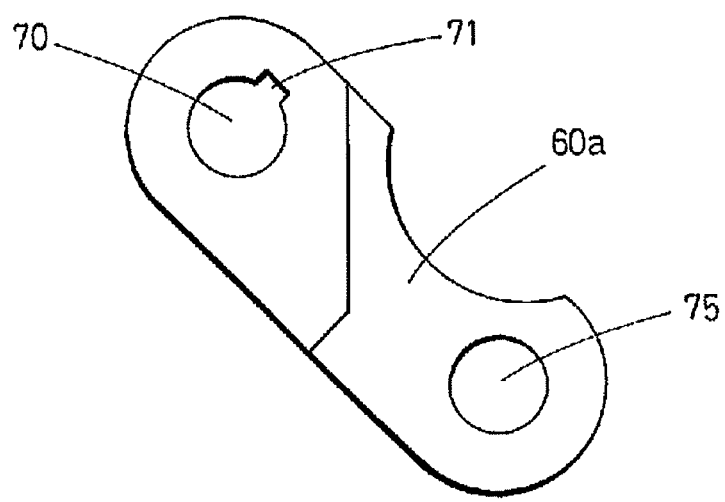
FIG. 1d is a profile view of a plate of one of the connection members of a structural profile rotator according to the invention.

FIG. 1a shows a first blade 10 which comprises a thin elongated portion 10a and a thick portion 10b provided with a through-hole 20 with a keyway 21. The through hole 20 and the keyway 21 are arranged to fixedly attach said first blade 10 to the spindle (described below) with the insertion of a key (described below). On the lower face of the thin elongated portion 10a a plate 30 is disposed, arranged to secure the pushing member (described below).

FIG. 1b shows a second blade 40 which comprises a thin elongated portion 40a and a thick portion 40b provided with an upper hole 50 arranged to attach said first blade 10 to the spindle, and a lower hole 55 arranged to attach said second blade 40 to the pushing member (described below).

FIG. 1c shows the joint of the first blade 10 and the second blade 40 to the spindle 5. Said joint is formed by the spindle 5 being disposed in the hole 20 of the first blade 10 and simultaneously, in the upper hole 50 of the second blade 40. A key 15 introduced in the keyway 21 of the hole 20 of the first blade 10, allows the first blade 10 to be fixedly attached to the spindle 5.

FIG. 1d shows a plate 60a of the first connection members. Said plate 60a is provided, in its upper part with a through hole 70 with a keyway 71 arranged to fixedly attach said connection member to the spindle with the insertion of a key (described below), the plate 60a being moreover provided with another through hole 75 in its lower part, arranged to attach said connection member to one of the rotation members.

Figure 2A:
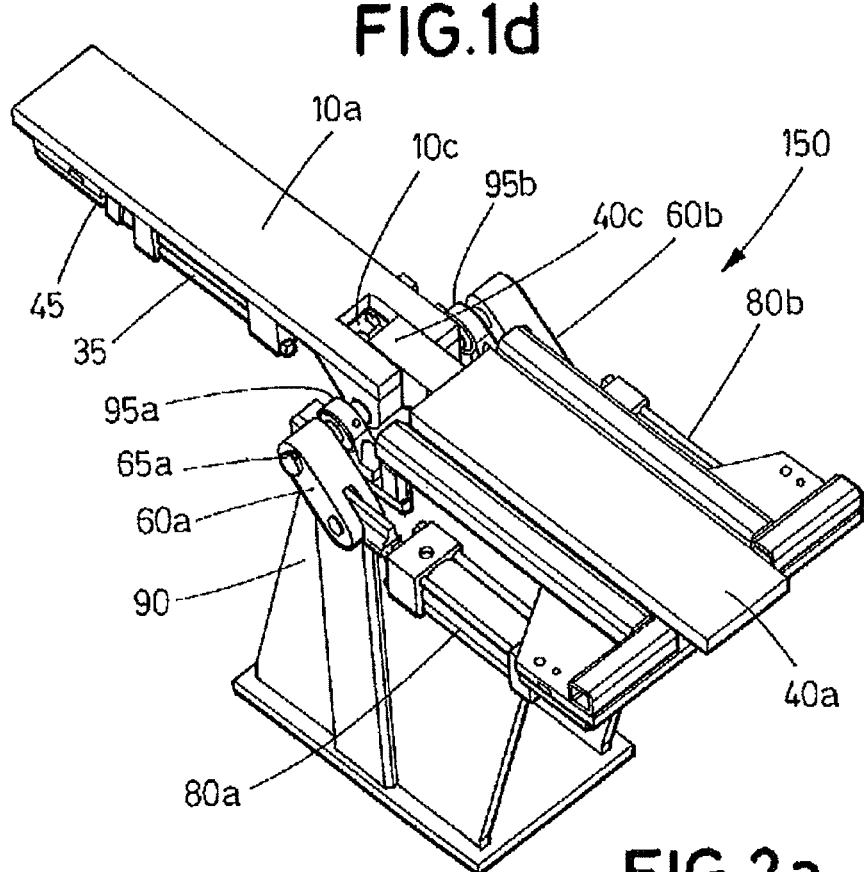
FIG. 2a is a perspective view of a structural profile rotator according to the invention.
Figure 2B:
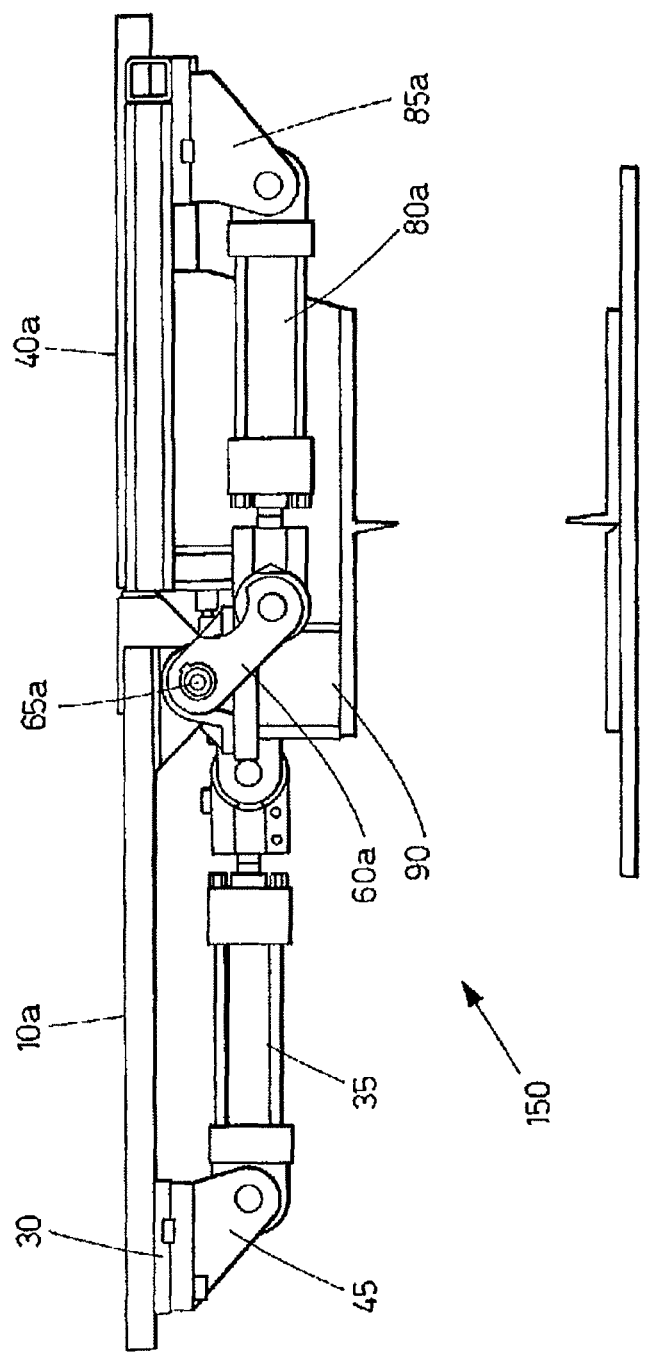
FIG. 2b is a profile view of the upper part of a structural profile rotator according to the invention.

FIGS. 2a and 2b show a structural profile rotator 150 which comprises the support 90 provided, in its upper part, with two parallel lugs 95a, 95b, in which the spindle is housed. The first blade 10 and the second blade 40 are attached to the central part of said spindle (in these figures only their respective thin elongated portions 10a, 40a and their parts nearest to the spindle are visible, provided, respectively, in their central region with a slot 10c and with a part 40c in the shape of a peg). The ends of the spindle are attached to the plates 60a, 60b of the connection members, which are attached in turn, to respective rotation members 80a, 80b which are, in this case, hydraulic cylinders.

The first rotation member 80a is firmly attached to the support 90 by means of a joining part 85a. The joint of the second rotation member 80b to the support 90 is identical, although it is not visible in the drawings.

Said FIGS. 2a and 2b also show the key 65a of the first plate 60a. Said key 65a is inserted in the keyway 71 to fixedly attach the plate 60a to the spindle. The second plate 60b is fixedly attached to the spindle 5 in an identical manner (although its key is not visible in the drawings).

The plate 30 provided in the first blade 10 is attached to one end of the securing part 45, said securing part 45 being attached by its other end to the pushing member 35.

FIG. 3a shows how, when the pushing member 35 is actuated in the direction and sense of the arrow 100, the second blade 40 which comprises the thin elongated portion 40a and the thick portion 40b, describes the path indicated by the arrow 200 until forming 90° with the first blade 10 (of which only its thin elongated portion 10a is visible).

Similarly, FIG. 3b shows how when rotation members 80a and 80b are actuated (the latter not visible in the drawing) in the direction and sense of the arrows 300a and 300b, the spindle rotates, in such a way that the first blade 10 (of which only its thin elongated portion 10a is visible) and the second blade 40 (of which only thin elongated portion 40a and its peg 40c are visible) rotate 90° describing the path indicated by the arrow 400.

FIG. 4 shows the pulling means 250 which comprise a central body 110 on which a conveyor chain 120 is disposed, said conveyor chain 120 being actuated by a toothed wheel 130, attached to a geared motor 155 through a geared motor chain 140. The central body 110 is provided moreover with a lifting member in the shape of a hydraulic cylinder 160 arranged to lift the pushing chain 120 up to the height of the crossbar 600e of the frame of the structural profile supporting framework (described below), on which a structural profile 500 is resting.

FIG. 5 shows, in full, the structural profile rotator and conveyor assembly, which comprises the structural profile rotator 150 disposed in parallel to the pulling means 250 of the structural profile conveyor device.

Said structural profile conveyor device comprises moreover the structural profile supporting framework consisting of:
the frame formed by crossbars 600a, 600c, 600d, said frame being provided also with an additional crossbar 600e which separates the zone where the structural profile rotator 150 is disposed from the zone where the pulling means 250 are disposed, and
the pillars 610a, 610b, 610c, 610d, 610e and 610f.

In this text, the word "comprises" and its variants (such as "comprising" etc.) should not be interpreted in an excluding manner, in other words, they do not exclude the possibility of what is described including other elements, steps, etc.

On a separate note, the invention is not limited to the specific embodiments that have been descried and rather also encompass, for example, the variants that may be embodied by the average person skilled in the art (for example, with regard to the choice of materials, dimensions, components, configuration, etc.), within that inferred from the claims.

The invention claimed is:

1. Structural profile rotator, which comprises two blades (10, 40), characterised in that
each one of the blades (10, 40) is attached, by a point close to one of its ends, to a central portion of a spindle (5), in such a way that said blades define a variable angle between them,
the first blade (10) being fixedly attached to said spindle (5)
the second blade (40) being attached; to the spindle (5) in a non fixed manner,
the second blade (40) being moreover attached to at least one pushing member (35), disposed below the first blade (10) and arranged to push said second blade (40) so that it rotates about the spindle (5) to modify the angle between said first blade (10) and said second blade (40),
each of the two end portions of the spindle (5) being attached fixedly to a connection member attached, in turn, to a rotation member (80a, 80b) arranged to rotate said spindle (5) to make said first blade (10) pivot.

2. Rotator according to claim 1, characterised in that it is configured so that said variable angle can be varied between 90° and 180°.

3. Rotator according to claim 1, characterised in that when the blades (10, 40) are oriented horizontally, the pushing member (35) is situated to one side of the vertical plane comprising the spindle (5), and the rotation members (80a, 80b) are situated on the other side of said vertical plane comprising the spindle.

4. Structural profile rotator according to claim 1, characterised in that the rotator comprises a support (90) provided, in its upper part, with two parallel lugs (95a, 95b), said lugs (95a, 95b) being provided with respective through holes aligned with each other, arranged to house the spindle (5).

5. Structural profile rotator according to claim 1, characterised in that each one of the connection members comprises a plate (60a, 60b) provided, in its upper part, with a hole (70) with a keyway (71) arranged to fixedly attach said connection member to the spindle with the insertion of a key (65a), each plate being moreover provided with another through hole in its lower part (75) arranged to attach said connection member to one of the rotation members (80a).

6. Structural profile rotator according to claim 1, characterised in that each blade (10, 40) comprises a thin elongated portion (10a, 40a) arranged to retain and/or support the structural profiles (500) and a thick portion (10b, 40b) which extends in a direction perpendicular to the surface of the thin elongated portion and is arranged for the connection of said blade with other elements of the rotator.

7. Structural profile rotator according to claim 6, characterised in that the first blade (10) is provided in its thick portion (10b) with at least one hole (20) with a keyway (21) arranged to fixedly attach said first blade (10) to the spindle (5) with the insertion of a key (15).

8. Structural profile rotator according to claim 6, characterised in that the second blade (40) is provided in its thick portion (40b) with a first hole (50) arranged to attach said first blade (10) to the spindle (5) and a second hole (55) arranged to attach said second blade (40) to the pushing member (35).

9. Structural profile rotator according to claim 6, characterised in that the thick portion (10b) of the first blade (10) is provided, in the central region of its end nearest to the spindle (5), with a slot (10c); the thick portion (40b) of the second blade (40) being likewise provided, in the central region of its end nearest to the spindle (5) with a part (40c) in the shape of a peg which has a substantially similar width to the width of the slot (10c) provided in the first blade (10).

10. Structural profile rotator according to claim 1, characterised in that the pushing member (35) and/or the rotation members (80a, 80b) are hydraulic cylinders actuated by a motor or an electrovalve.

11. Structural profile rotator according to claim 1, characterised in that the pushing member (35) and/or the rotation members (80a, 80b) are leadscrews actuated by a motor.

12. Structural profile rotator according to claim 1, characterised in that the pushing member (35) is attached to the first blade (10).

13. Structural profile rotator and conveyor assembly, which comprises a rotator according to claim 1, and a structural profile conveyor device, arranged to convey structural profiles (500) according to a determined direction of transport, the structural profile rotator (150) being disposed in parallel to said structural profile conveyor device, in such a way that the two blades (10, 40) of the structural profile rotator, when they form an angle of 180° with each other, are parallel to the direction of transport of the structural profile conveyor device.

14. Structural profile rotator and conveyor assembly according to claim 13, characterised in that the structural profile conveyor device comprises:
- a supporting framework for structural profiles provided with a frame (600*a*, 600*b*, 600*c*, 600*d*, 600*e*) held by pillars (610*a*, 610*b*, 610*c*, 610*d*, 610*e*, 6100, said supporting framework being arranged to support the structural profiles (500); and
- structural profile pulling means (250), housed inside the frame (600*a*, 600*c*, 600*d*, 600*e*) of the supporting framework and arranged to pull the structural profiles (500) to move them in the direction of transport.

15. Structural profile rotator and conveyor assembly according to claim 14, characterised in that the pulling means comprise a central body (110) on which a conveyor chain (120) is disposed, said conveyor chain (120) being actuated by a toothed wheel (130), attached to a geared motor (155) through a geared motor chain (140).

16. Structural profile rotator and conveyor assembly according to claim 14, characterised in that the pulling means (250) are disposed below the frame (600*a*, 600*c*, 600*d*, 600*e*) and are provided with a lifting member (160), arranged to lift said pulling means (250) and situate them at the same height as the frame (600*a*, 600*c*, 600*d*, 600*e*).

17. Structural profile rotator and conveyor assembly according to claim 16, characterised in that the lifting member (160) of the pulling means (250) comprise at least one hydraulic cylinder or leadscrew actuated by a motor.

18. Structural profile rotator and conveyor assembly according to claim 14, characterised in that the structural profile conveyor device (500) comprises two pulling means (250) parallel to the structural profile rotator (150) and disposed on either side of said structural profile rotator (150), each one of said pulling means (250) being arranged to pull one of the ends of the structural profiles (500).

19. Structural profile rotator and conveyor assembly according to claim 13, characterised in that it comprises two or more rotators (150) of structural profiles (500) and a structural profile conveyor device, said structural profile conveyor device comprising two or more pulling means (250).

20. Method of use of a structural profile rotator and conveyor assembly according to claim 13, characterised in that it comprises the following stages:
a) loading a structural profile (500) on the structural profile conveyor device, in such a way that the main axis of the structural profile (500) is substantially perpendicular to the direction of transport;
b) actuating the structural profile conveyor device to convey said structural profile (500) to the working position where the holes, slots and/or reliefs are made on a first face of said structural profile (500);
c) actuating the structural profile conveyor device so that it moves in an opposite direction to the one described in stage b) and removes said structural profile (500) from the working position, conveying it to a position where the structural profile (500) rests on the first blade (10) of the structural profile rotator (150) at a point close to the spindle, said structural profile rotator (150) moreover having its two blades forming an angle of 180° to each other;
d) actuating the pushing member (350) of the structural profile rotator to rotate the second blade (40) to a position in which it forms an angle of 90° with the first blade (10);
e) actuating the rotation members (80*a*, 80*b*) of the structural profile rotator to rotate the spindle 90°, in such a way that both the first blade (10) and the second blade (40) equally rotate 90°, rotating the structural profile (500);
f) actuating the rotation members of the structural profile rotator (150) in the opposite sense to that of stage e) to rotate the first blade (10) until it once again forms 180° with the second blade (40);
g) repeating stages b) to f) as many times as required.

\* \* \* \* \*